Feb. 4, 1958 H. M. CHAMP ET AL 2,822,197
BEARING SEAL WITH A PRESSURE RELIEF VALVE
Filed Nov. 2, 1954
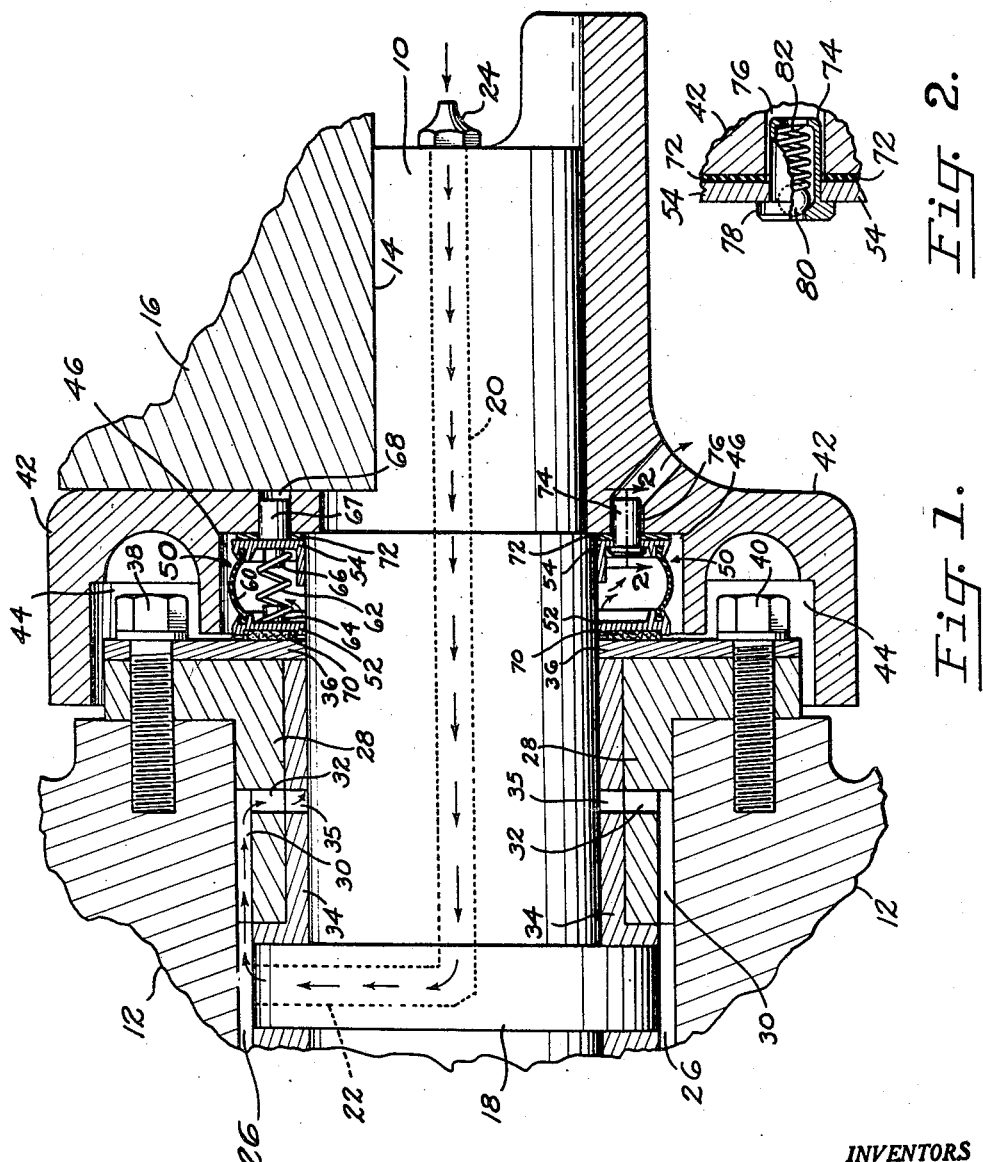
INVENTORS
Harley M. Champ
Theodore R. Williams
BY Donald H. Champ
Atty.

2,822,197
BEARING SEAL WITH A PRESSURE RELIEF VALVE

Harley M. Champ, Theodore R. Williams, and Donald H. Champ, Portland, Oreg.

Application November 2, 1954, Serial No. 466,417

2 Claims. (Cl. 286—8)

This invention relates to a bearing and seal assembly of the class employed for mounting the rollers of crawler type tractors.

In the manufacture of crawler or endless track laying type tractors, the tracks conventionally are mounted on a plurality of rollers mounted on stationary shafts. Each roller and shaft assembly is comprised of a number of parts and provided with means for lubricating the assembly with a pressure gun. This may be accomplished, for example, by employing a hollow shaft provided with a grease gun fitting and communicating with the bearing surfaces to be lubricated.

In such assemblies it is of paramount importance that suitable sealing means be employed for barring access of dirt and moisture to the interior of the assembly, since if such foreign agents were to be admitted, excessive wear, scoring, and corrosion of the parts would be the obvious result. In view of the great weight of the tractor and the substantial end thrust to which the roller assemblies are subjected, the sealing means employed preferably is of the diaphragm or bellows type which is resiliently expansible so that a tight seal is maintained at all times.

In the use of diaphragm sealing rings of this class the primary difficulty has been encountered that the diaphragms frequently are ruptured during the lubrication of the assembly. The diaphragms will withstand a force of the order of about 200 p. s. i. whereas the lubricating pressures are of the order of 2,000 p. s. i. Hence the introduction of lubricant at such high pressure will rupture the diaphragms, necessitating the replacement of the entire sealing ring. Since the rings are costly, their replacement heretofore has been a significant item in the maintenance costs of tractors and other equipment of this type.

Accordingly it is the general object of the present invention to provide a bearing and seal assembly for crawler type tractors and the like which may be lubricated without danger of rupturing the seal even though high pressure lubrication is employed.

It is another object of the present invention to provide a bearing and seal assembly which is proof against damage by high pressure lubrication but which may be installed at low cost and without radical modification of the conventional assembly.

Still another object of the present invention is the provision of a bearing and seal assembly which while proof against rupture by pressure lubrication still is sealed effectively against the entry of water and dirt under rigorous conditions of use.

The manner in which the foregoing and other objects of this invention are accomplished will be apparent from the accompanying specifications and claims considered together with the drawings wherein:

Figure 1 is a sectional view in elevation of the bearing and seal assembly of this invention; and Figure 2 is a detail sectional view in elevation taken along the line 2—2 of Figure 1.

As is apparent from the drawing, the presently described bearing and seal assembly is designed for use in combination with two relatively rotatable, radially inner and outer members, for example, a roller shaft 10 upon which is mounted rotatably the roller 12. The roller may be of conventional construction, depending upon the contemplated use. The shaft 10 is formed with a flattened surface 14 for mounting in a frame member 16 to lock the roller against rotation. Also, the shaft is formed with a centrally located section 18 of enlarged cross section The means employed for lubricating the assembly comprise channel means including an axial bore 20 centrally of the shaft which communicates with a radial bore 22. The entrance to the axial bore is provided with a conventional fitting 24 for attachment of a pressure grease gun. The outer end of radial bore 22 communicates with a passageway 26 formed between the roller and the other elements of the assembly.

Such other elements may comprise a bushing carrier 28 formed with an axial channel 30 and a radial channel 32. It also includes a bushing 34 having a radial passageway 35 which substantially registers with passageway 32 in the bushing carrier. Both bushing and bushing carrier are maintained in position by suitable means which in the illustrated embodiment comprise the wear plate 36 and cap screws 38, 40.

The elements of the assembly are protected by means of the end collar or dust cap 42. The inner face of this member is provided with spaced apart, annular troughs 44, 46. The former receives the heads of cap screws 38, 40. The latter receives an annular sealing ring assembly indicated generally at 50.

Although the sealing ring assembly may be variously constructed, in the illustrated form it comprises a pair of spaced apart interdigitated inner and outer skeleton rings 52, 54. These are interconnected by means of a diaphragm 60 which may be fabricated from a strip of rubber or other resilient material crimped into opposed grooves in the skeleton rings. Also, the two rings are urged continuously to their extended position by means of a circumferential series of coil springs 62, mounted on pegs 64, 66 extending inwardly from the rings. Alignment pegs 67 are provided on outer skeleton ring 54 and extend into recesses 68 in end collar 42.

Further included in the sealing ring assembly are an inner sealing gasket 70 and an outer sealing gasket 72. The former may be made of leather or other suitable material and faces against wear plate 36. The latter preferably is made of rubber and faces against end collar 42. In addition, its dimensions are such that it engages in sealing relation the periphery of shaft 10. Accordingly there is provided a resilient seal which effectively seals off the bearing areas of the assembly at all times.

As has been mentioned above, the rubber diaphragm 60 with which the bearing seal 50 is provided will withstand limited internal pressures only. To protect it against lubricating pressures of a much higher order, there is included in the ring assembly pressure release valve means of suitable design. It comprises a cup 74 pressed into an opening in the sidewall of skeleton ring 54 and extending into an opening 76 in end collar 42. The cup is open at both of its ends, the inner end having attached thereto a perforated cap 78 formed with a seat for a ball valve.

Contained within the cup is the ball valve 80 continuously urged against the seat in cap 78 by means of coil spring 82. Thus there is afforded a pressure release means, the lubricant being forced through the sealing ring, 50, through the pressure release valve and thence out through opening 76 in the end collar.

Operation

The operation of the herein described bearing and seal assembly is as follows.

When it is desired to lubricate the assembly, a pressure grease gun is placed over fitting 24. Lubricant at high pressure then is forced through bores 20 and 22 in the shaft and out into channel 26 which communicates with channels 32 and 35. Since this channel system may be duplicated on the other end of the shaft, as well as at the bottom side thereof, means is afforded for introducing lubricant effectively to all of the bearing surfaces.

The lubricant then works its way between bushing 34 and shaft 10, past wear plate 36, and into the interior of sealing ring 50. There, rather than rupturing rubber diaphragm 60, it opens the pressure release valve therein and passes through it into channel 76 and thence to the exterior. Accordingly, the presence of the lubricant will be apparent to the operator who becomes aware that the assembly has been efficiently lubricated.

Thus it will be apparent that by the present invention I have provided a bearing and seal assembly which is proof against rupture by the application of high pressures. The assembly is versatile, furthermore, and may be used in numerous types of apparatus including a roller and a shaft, effectively sealing the same against entry of moisture and dirt.

It is to be understood that the form of our invention herewith shown and described, is to be taken as a preferred example of the same, that various changes in the shape, size and arrangement of parts may be resorted to, without departing from the spirit of our invention, or the scope of the subjoined claims.

Having thus described our invention we claim:

1. For use between a rotatable member and an exposed fixed member having an opening therethrough and wherein lubricant is adapted to be received under pressure between said rotatable and fixed members: a lubricant seal comprising a pair of axially spaced ring members interconnected by a peripheral resilient diaphragm, one of the ring members being adapted to abut against the rotatable member and the second ring member being adapted to be secured to the fixed member, a tubular member secured to the second ring member and arranged to extend into the opening of the fixed member, the opening in the tubular member communicating at its inner end with the space between the pair of ring members and at its outer end with the atmosphere, and pressure relief valve means in the tubular member movable under the influence of a predetermined elevated pressure within said space from a normal position sealing said space from the atmosphere to a position opening said space to the atmosphere.

2. For use between a rotatable member and an exposed fixed member having an opening therethrough and wherein lubricant is adapted to be received under pressure between said rotatable and fixed members: a lubricant seal comprising a pair of axially spaced ring members interconnected by a peripheral resilient diaphragm, one of the ring members being adapted to abut against the rotatable member and the second ring member being adapted to be secured to the fixed member, the second ring member having an opening therethrough adapted to register with the opening in the fixed member, whereby to connect the space between the pair of ring members with the atmosphere, and pressure relief valve means in said registering openings movable under the influence of a predetermined elevated pressure within said space from a normal position sealing said space from the atmosphere to a position opening said space to the atmosphere.

References Cited in the file of this patent

UNITED STATES PATENTS

| | | |
|---|---|---|
| 2,157,597 | Dupree | May 9, 1939 |
| 2,283,871 | Norelius | May 19, 1942 |
| 2,491,233 | Vedovell | Dec. 13, 1949 |